UNITED STATES PATENT OFFICE.

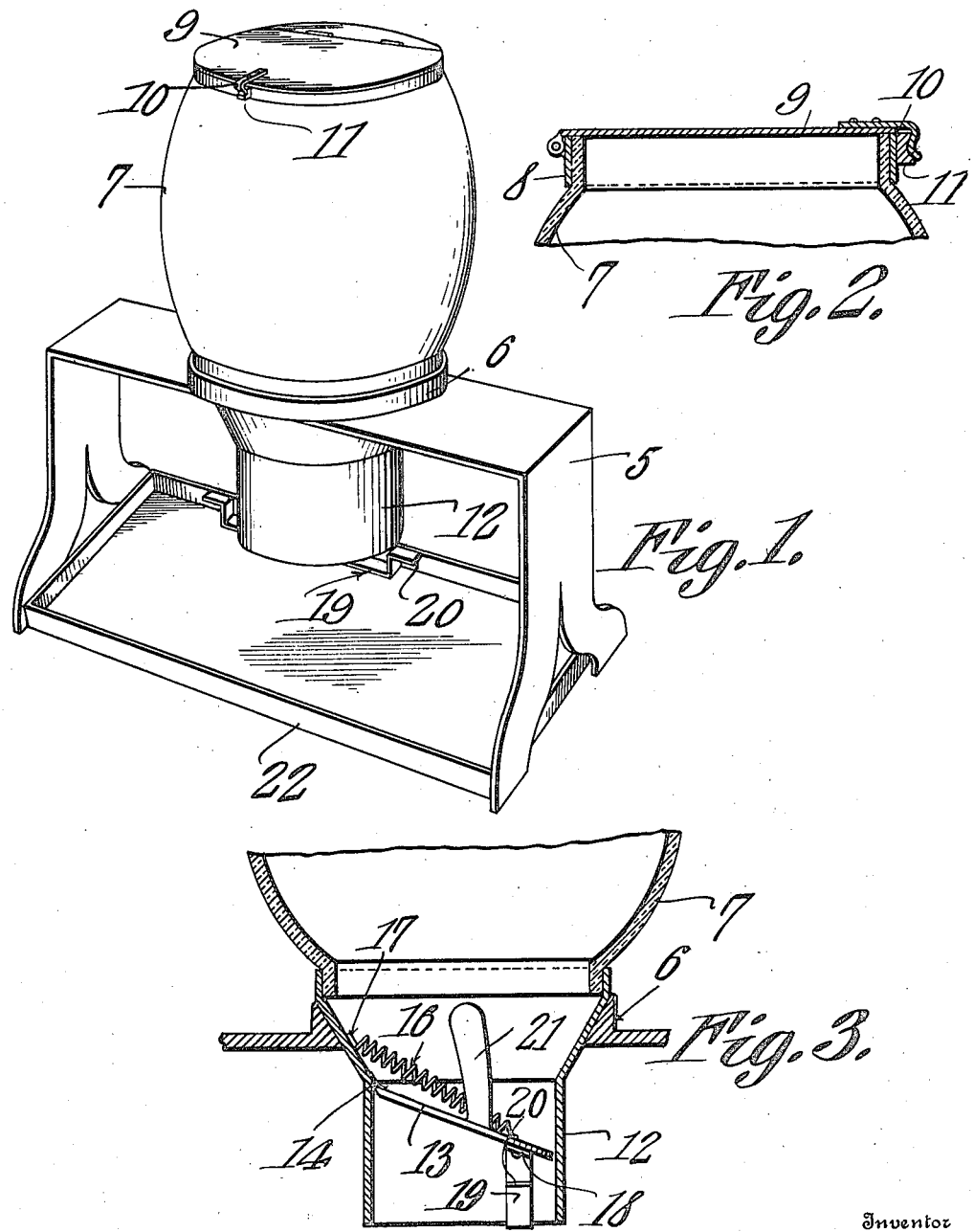

HIRAM C. WARREN, OF CLEARFIELD, PENNSYLVANIA.

CRACKER-JAR.

961,470. Specification of Letters Patent. Patented June 14, 1910.

Application filed January 5, 1910. Serial No. 536,471.

*To all whom it may concern:*

Be it known that I, HIRAM C. WARREN, a citizen of the United States, residing at Clearfield, in the county of Clearfield and State of Pennsylvania, have invented a new and useful Cracker-Jar, of which the following is a specification.

It is the object of the present invention to provide an improved construction of cracker jar and the invention aims more specifically to provide a jar of this class which will be particularly well adapted for use in cafés and restaurants, the primary object of the invention being to obviate handling of the crackers by customers and the dropping of food into the crackers. Ordinarily, such crackers are contained in an open bowl or dish or jar and are removed by hand, but the present invention contemplates the provision of a cracker jar or container, at the lower end of which is arranged a closure which may be so moved as to allow a quantity of crackers to fall from the jar, the jar or container being otherwise closed so as to prevent the hand of the customer from coming into contact with the crackers except those which are removed from the jar, and to prevent food falling into the crackers.

The invention further aims to provide, in a device of this class, a container having a closure hinged at its lower end, means normally holding the closure in closed position, and a handle or handles carried by the closure and projecting therefrom in such direction that one hand may be conveniently employed in swinging down the closure to open position, while the other hand is held beneath the closure to receive the crackers discharged from the container.

A further object of the invention is to provide upon the closure a novel means for loosening any crackers which may become packed in the container and consequently to insure of proper discharge of crackers from the container.

With the above and other objects in view, the invention consists, generally, in the construction and arrangement of parts shown in the accompanying drawings in which,—

Figure 1 is a perspective view of the device embodying the present invention. Fig. 2 is a vertical sectional view through the upper end of the device. Fig. 3 is a similar view through the lower end thereof.

In the drawing, the device is illustrated as mounted upon a suitable supporting stand, the legs of which are indicated by the numeral 5 and support between them an annular body 6 which is designed to receive the containers for the crackers. The said container comprises a bowl or body 7 which may be cylindrical, globular, or of any other desired form and upon the upper or open end of which is fitted a band 8 to which is hinged a lid or cover 9, the said cover being held closed by means of a spring catch 10 engaging frictionally with a notched keeper 11 upon that side of the band directly opposite the point at which the lid is hinged to the band. It will be understood of course that when the container is to be filled, this lid is to be swung up upon its hinge and the crackers are to be poured into the jar after which the lid is swung down to closed position, the catch 10 engaging automatically with its keeper. The body 7 of the container is open at its lower end as well as at its upper end and fitted upon its lower end and depending therebeneath is a hopper which is indicated by the numeral 12 and constitutes the bottom of the container. This hopper is of such diameter as to fit within the annular body 6 of the stand for the device and the device is in this manner supported by the stand in such a way as to be adapted for disposal upon a table or counter.

As heretofore stated, there is provided within the said hopper 12 a closure which is to be partly opened to permit of the discharge of crackers or other material from the container, and this closure is indicated by the numeral 13, it being hinged as at 14 in inclined position with its hinged end uppermost within the hopper 12. A spring 16 is secured at its upper end as at 17 to the wall of the hopper above the hinge 14 and in turn at its lower end to the upper face of the closure 13 in advance of the hinge and this spring serves to normally yieldably hold the closure 13 in the position shown in the drawings, or in other words in closed position. In order, however, that the closure may be readily swung to open position whereby to permit of the discharge of crackers or other food from the container, there are provided handles of which there are preferably two, these handles being secured as at 18 to the under face of the closure 13 at each side thereof and projecting from their portions 18 downwardly to the lower end of the hopper 12 thence laterally outwardly and thence upwardly beside the opposite sides thereof, as at 19 and at their upper ends laterally at right angles as at 20. It will be understood from the foregoing that the handle portions 20 of the handles may be depressed whereby to swing the closure 13 to open position, and inasmuch as these handles are located one at each side of the hopper 12, customers seated upon opposite sides of the jar may use the same with equal facility. It will also be understood that by so locating the handles that they will project laterally from the closure at opposite sides of the hopper portion of the container, either hand may be readily employed in depressing the handles while the other hand is held beneath the hopper to receive the crackers which are in the container; further, that the hand depressing or swinging down the closure will not be in the way of the hand receiving the crackers.

Inasmuch as the crackers may become clogged or packed in the hopper, there is provided means for loosening the mass of crackers which means is embodied in an upstanding finger 21 which is secured upon the upper face of the closure 13 and projects upwardly and preferably at an angle rearwardly therefrom so as to extend up into the hopper 12, it being understood that when the closure is swung down to open position, this finger will swing in a corresponding direction and will move through the mass of crackers in the container and loosen such mass.

A tray 22 is preferably disposed beneath the device and between the legs 5 of the stand upon which the container of the device is supported, this tray being designed to catch broken crackers, crumbs, etc.

It will be observed that to allow for swinging movement of the closure 13, the same is made slightly smaller in breadth and length than the interior dimensions of the hopper 12.

From the foregoing description of the invention, it will be seen that there is provided a simple and inexpensive cracker jar or container which is particularly well adapted for use in cafés and restaurants and which may be conveniently used by the customers of such establishments. It will also be understood that while the device is designed primarily for use in containing crackers, it may be equally as well employed for the purpose of containing lumps of sugar or other similar articles of food.

What is claimed is:—

In a device of the class described, a container, a discharge hopper leading from the lower end to the container, a closure hinged within said hopper and of slightly less diameter than the said hopper, a spring connected to the closure and normally holding the same elevated, and a handle comprising a strip secured to the under side of the closure and projecting downwardly therefrom and thence bent to extend beneath and in engagement with the lower end edge of the hopper, the said strip being thence bent to extend upwardly beside the hopper and finally bent to project laterally to afford a finger piece, the engagement of the handle with the lower end edge of the hopper serving to limit the upward movement of the said closure.

In testimony that I claim the foregoing as my own, I have hereto affixed my signature in the presence of two witnesses.

HIRAM C. WARREN.

Witnesses:
L. L. BAILEY,
G. B. MANN.